(12) United States Patent
Penfornis et al.

(10) Patent No.: US 8,137,099 B2
(45) Date of Patent: Mar. 20, 2012

(54) METHOD FOR CALCINATION OF A MATERIAL WITH LOW NOCHI EMISSIONS

(75) Inventors: Erwin Penfornis, Levallois-Perret (FR); Maguelonne Hammel, Montigny le Bretonneux (FR); Pascal Duperray, Montigny le Bretonneux (FR); Xavier Paubel, Chatenay Malabry (FR)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 831 days.

(21) Appl. No.: 11/997,584

(22) PCT Filed: Aug. 2, 2006

(86) PCT No.: PCT/FR2006/050777
§ 371 (c)(1),
(2), (4) Date: May 21, 2008

(87) PCT Pub. No.: WO2007/015029
PCT Pub. Date: Feb. 8, 2007

(65) Prior Publication Data
US 2009/0130615 A1 May 21, 2009

(30) Foreign Application Priority Data
Aug. 3, 2005 (FR) ..................... 05 52422

(51) Int. Cl.
*F27B 7/36* (2006.01)
(52) U.S. Cl. ............. 432/14; 432/105; 431/4; 110/342
(58) Field of Classification Search .......... 431/4, 8, 431/10; 432/1, 14, 103, 111, 105; 110/226, 110/246, 342, 346
See application file for complete search history.

(56) References Cited

U.S. PATENT DOCUMENTS

| | | | |
|---|---|---|---|
| 3,397,256 A | 8/1968 | Paul et al. | |
| 3,519,254 A | 7/1970 | Putman | |
| 4,523,529 A | 6/1985 | Poll et al. | |
| 5,302,111 A | 4/1994 | Jouvaud et al. | |
| 5,572,938 A | 11/1996 | Leger | |
| 5,580,237 A | 12/1996 | Leger | |
| 6,309,210 B1 | 10/2001 | Marin et al. | |
| 6,318,278 B1 * | 11/2001 | Dugue et al. | 110/348 |
| 6,375,456 B1 * | 4/2002 | Dugue et al. | 432/1 |
| 7,452,203 B2 * | 11/2008 | Laux et al. | 432/111 |
| 7,828,548 B2 * | 11/2010 | Riddle | 432/105 |

FOREIGN PATENT DOCUMENTS
WO  WO 2004/065849   8/2004

OTHER PUBLICATIONS
PCT/FR2006/050777 International Search Report and Written Opinion, mailed Jan. 18, 2007.

* cited by examiner

*Primary Examiner* — Gregory A Wilson
(74) *Attorney, Agent, or Firm* — Christopher J. Cronin

(57) ABSTRACT

The invention relates to a method for calcination of a material in which said material is heated by contact with a heat source essentially generated by means of a flame produced with at least one flow of fuel and primary air and a flow of secondary air, the flame comprising a first combustion zone with a temperature below 1500° C. and a second combustion zone with a temperature above 1500° C., where at least one flow of at least one inert gas is injected into the flame at the beginning of the second combustion zone and/or at least one flow of oxygen or a gas enriched in oxygen is injected into the second combustion zone.

16 Claims, 3 Drawing Sheets

METHOD FOR CALCINATION OF A MATERIAL WITH LOW NOCHI EMISSIONS

This application is a 371 of International PCT Application PCT/FR2006/050777, filed Aug. 2, 2006.

BACKGROUND

1. Field of the Invention

The present invention relates to a method of improving the combustion in a high-temperature industrial kiln and to a device for improving the combustion in such a kiln.

2. Related Art

It is known that high-temperature industrial processes using as energy supply fuels having a not insignificant nitrogen content, such as coal or petroleum coke, generate substantial emissions of nitrogen oxides (NOx). NOx is the collective term to denote all nitrogen oxides, particularly nitrogen monoxide (NO) and nitrogen dioxide ($NO_2$). Two types of NOx may mainly be distinguished, depending on the mechanism of their formation: fuel NOx and thermal NOx. Fuel NOx results from the oxidation of the nitrogen compounds in the fuel. Thermal NOx, which corresponds to oxidation of atmospheric nitrogen by the combustion oxygen, depends mainly on three variables:

the oxygen concentration in the high-temperature zones of the flame (>1200° C.);

the residence time of the oxygen in these zones; and most particularly the temperature in these zones.

NOx is toxic to plants and nitrogen dioxide in particular may trigger respiratory difficulties in humans. NOx is also one of the main precursors in ozone formation. In addition, NOx emissions contribute to acidification and eutrophization of the soil.

The problem of Nox emissions arises in all industries that use high-temperature processes. One of the industries particularly concerned is that of cement manufacture, in which the manufacturing processes are subject to stricter standards relating to nitrogen oxide (NOx) emissions. In these cement production processes the formation of NOx from fuel is due to the use of fuels having a not insignificant nitrogen content, for which the oxidation of the nitrogen-containing compounds of the fuel results in the formation of NO. This mechanism takes place both in the burner of the rotary kiln, upon ignition of the fuel, and in the precalciner when there is one. Thermal NOx for its part is inevitable in the combustion zone of the rotary kiln, because of the need for a temperature high enough for what is called the clinkering reaction carried out on the raw feed (1450° C., thus accelerating the oxidation of atmospheric nitrogen.

The current techniques for reducing the NOx emissions may be put into two categories: primary techniques limiting NOx formation during combustion and secondary techniques based on treatment of the flue gases in order to remove the NOx created upstream.

To allow the formation of NOx to be effectively reduced in cement production processes, any primary technique must limit the formation of both fuel NOx and thermal NOx. Among the main primary measures taken, the following may be listed: low-NOx burners, which optimize the mixing of the fuel and of the various oxidizer injections so as to limit mainly the formation of thermal NOx by a local combustion staging effect. This method reaches its limits in the flame instabilities that are generated when the primary air is reduced below acceptable limits (~10% of the stoichiometric air needed). The achievable reductions are thus around 30%;

flame cooling by water injection, which has the objective of reducing the thermal NOx by lowering the temperature peaks in the flame. Thus, NOx reductions up to 50% may be achieved, but this method significantly reduces the combustion efficiency and proves to be the cause of problems in the operation of the kiln; and staging of the combustion between the rotary kiln and the precalciner when there is one, which makes it possible to reduce the NOx at high temperature at the outlet of the rotary kiln and to subsequently complete the combustion downstream, in the precalciner and the preheating unit. NOx reduction levels up to 50% are claimed, but these systems are expensive in terms of investment cost because of substantial modifications to the installation that they require. Also mentioned are many problems of excess CO formation, which prevent regular NOx reduction levels from being obtained.

At the present time none of these primary techniques is capable of reducing NOx emissions sufficiently thereby obliging cement producers to use costly secondary methods in order to meet the standards in force.

The secondary measures taken are conventional ones: these involve catalytic or non-catalytic NOx reduction processes (SNCR=selective non-catalytic reduction; SCR=selective catalytic reduction) based on injecting ammonia or urea into the flue gases in order to reduce the NO to $N_2$. Larger NOx reductions are therefore possible, but for significantly higher investment and operating costs. Furthermore, these techniques require very precise temperature ranges and any deviation may then result in the emission of unreacted ammonia in the flue gases, which may then oxidize to NOx.

Apart from reducing NOx emissions, another major worry of cement manufacturers is how to achieve satisfactory efficiency and quality. Techniques employing the use of oxygen or oxygen-enriched gas have been developed. They are mainly designed to increase the production or quality of the product by enabling the temperature in the clinkering zone to be increased. Consequently, these techniques generally result in an increase in the NOx emission levels compared with operation without added oxygen, or at best said levels remaining the same.

Document U.S. Pat. No. 3,397,256 describes the use of an oxy-fuel burner placed between the charge and the main burner, with the effect that there is a significant increase in the temperature in this zone and therefore inevitably in the amount of NOx emitted.

Document U.S. Pat. No. 5,572,938 discloses the injection of oxygen into the primary air, via the main burner, for the purpose of improving the heat transfer to the charge and the production. No details are given as to the method of injection that limits the formation of fuel NOx. Oxygen injection is also proposed exclusively in the bottom part of the rotary kiln, along the charge, so as to stage the combustion. This specific positioning makes it possible to maintain oxidizing conditions above the charge and to transfer more energy thereto, but does not allow suitable mixing with all of the unburned materials.

Document U.S. Pat. No. 5,580,237 describes an injector for optimizing the injection of oxygen in the burner, for the purpose of flame stabilization. The amount of NOx emitted is maintained or slightly reduced.

U.S. Pat. No. 6,309,210 of the Applicant Company teaches the oxygen enrichment of primary, secondary and tertiary air so as to improve the cooling capability of the clinker and to improve the combustion in general. General dilution of the oxygen in all the combustion gases goes counter to the principles of reducing the amount of NOx emitted.

SUMMARY OF THE INVENTION

One object of the present invention is therefore to propose a novel technique for improving the combustion in a high-temperature industrial kiln, such as a rotary kiln, which makes it possible both to reduce NOx emissions and to obtain satisfactory efficiency and product quality.

For this purpose, the invention relates to a method of calcining a material, in which said material is heated in contact with a heat source essentially created by a flame generated by at least one flow (a) of fuel and primary air and a flow (b) of secondary air; the flame comprising a first combustion zone (I) with a temperature below 1500° C. and a second combustion zone (II) with a temperature above 1500° C., characterized in that:
- at least one flow (c) of at least one inert gas is injected into the flame at the point where the second combustion zone (II) starts; and/or
- at least one flow (d) of oxygen or an oxygen-enriched gas is injected into the second combustion zone (II).

The flame is divided into a first combustion zone and a second combustion zone according to the type of NOx that is formed in this zone during a conventional combustion process. Thus, the first combustion zone is the zone in which the combustion is initiated and in which the predominant NOx formation mechanism is that of fuel NOx. The second combustion zone is the zone in which the flame reaches its temperature peaks in contact with the secondary air and in which the formation of thermal NOx predominates. The boundary between the first and second combustion zones is set at the point where the flame temperature exceeds 1500° C., above which temperature the rate of thermal NOx formation significantly increases.

The injection of at least one flow of at least one inert gas at the point where the second combustion zone starts makes it possible, while maintaining as high a temperature as possible in the first combustion zone, to absorb thermal energy released during the combustion of the fuel with the secondary air in the second combustion zone. Thus, the flame temperature drops in the second combustion zone. Preferably, at least two inert-gas flows are placed symmetrically, so as to obtain better homogenization of the temperature within the flame. The inert gas or gases used for the injection at the point where the second combustion zone starts are advantageously chosen from the group consisting of nitrogen, recirculation flue gases, carbon dioxide and steam. Nitrogen is a preferred choice, in particular in the case in which its production on the operating site of the high-temperature process may be carried out in conjunction with the production of oxygen needed for other applications, such as the injection into the second combustion zone according to the invention. Advantageously, the flow or flows of inert gas or gases is (or are) injected with a greater velocity than that of the secondary air so as to have sufficient penetration right into the second combustion zone. However, this velocity will remain below the speed of sound as measured in the kiln, and preferably within a velocity range between Mach 0.2 and Mach 1 (Mach 1 corresponding to the speed of sound) so as to ensure immediate mixing of the inert gas or gases with the flame as soon as they enter the second combustion zone. For each application, a person skilled in the art will know how to define the number of flows for obtaining a satisfactory compromise between the quality of homogenization of the inert gas with the gases of the second combustion zone and one for a given overall flow rate of inert gas. As regards the quality of homogenization of the inert gas with the gases of the second combustion zone, a person skilled in the art will know that it increases with an increase in the number of flows of inert gas. As regards sufficient penetration into the second combustion zone, a person skilled in the art will know that this may be improved by increasing the momentum of these flows of inert gases, that is to say by reducing the number of flows. It will be understood here that momentum is the mass flow of gas multiplied by its velocity.

This mixing, and therefore rapid homogenization of the composition and of the flame temperature, may be facilitated by a swirling injection, characterized by a pulsed tangential component of the gas during its injection.

As regards the flow or flows of oxygen or of oxygen-enriched gas, this (these) is (are) preferably injected so that it (they) are tangential with the flame (F) in the second combustion zone. This makes it possible to increase the recirculation within the flame (F) and obtain mixing of the oxygen or oxygen-enriched gas and the flame at the end of the latter. In addition, by supplying oxygen in this way, the entire combustion is performed under fuel-rich conditions, reducing the flame temperature, shortening the residence time and reducing the oxygen concentration in the flame. In order to homogenize the oxygen supply, it is preferred to use at least two oxygen or oxygen-enriched gas flows placed symmetrically with respect to the axis of the flame. When at least one oxygen or oxygen-enriched gas flow is injected according to the invention into the second combustion zone, the flow rate of secondary air is advantageously reduced. Some of the oxygen that is normally provided by the secondary air is thus substituted with oxygen delivered by this injection. This prevents excessively oxygen-rich combustion conditions that would result in an increase in the flame temperature and would go counter to reducing the formation of thermal NOx. Preferably, the flow (or flows) (d) is (or are) injected with a velocity greater than Mach 0.5, preferably greater than Mach 1. Thus, one or more "coherent" oxygen or oxygen-enriched-gas jets are obtained which are not degraded during the first part of the path through the kiln and only mix with the unburned gases at the end of the flame, in a zone where the temperature has already decreased and in which the risk of thermal NOx formation is therefore reduced. In addition, this (or these) gas jet (or jets) increases (increase) the recirculation within the flame together with the supply of combustion products into the flame, thus making it possible to homogenize the temperature and reduce the temperature peaks of the flame.

In a preferred implementation, the two injection modes as described above are combined. Preferably, the injections are performed simultaneously.

Advantageously, the inert gas injection and/or the oxygen or oxygen-enriched-gas injection may be combined with a slight oxygen enrichment of the air for transporting and spraying the fuel, so as to increase the temperature in the fuel ignition zone and thus reduce the formation of fuel NOx, as described in patent application WO 2004/065849.

The calcining method according to the invention is particularly advantageous when solid fuels having a high nitrogen content, such as coal and petroleum coke, are used. When a solid fuel is used, this is sprayed by a carrier gas such as air, most generally air.

The method according to the invention may be used in any industrial process, such as the manufacture of lime, glass and, in particular, cement. The use of the method according to the invention for calcining an ore-based material is particularly advantageous.

However, the method according to the invention may also be used when all or some of the fuels employed for the high-temperature industrial combustion process are gaseous fuels having a low nitrogen content. In particular in the case of predominant use of a gaseous fuel having a low nitrogen content for a cement production process, the method according to the invention may advantageously be combined with the oscillating combustion system, which increases the inhibition of thermal NOx formation. This system is patented by the Applicant (U.S. Pat. No. 5,302,111).

The present invention also relates to a combustion device, which comprises:
- a burner that can be fed with oxidizer and fuel;
- an air injection means for delivering a flow of air around the burner;
- at least one inert gas injection lance having a first, gas inlet end and a second, gas outlet end, the second, gas outlet end being closer to the longitudinal axis of the burner than the first, gas inlet end; and/or
- at least one oxygen or oxygen-enriched-gas injection lance having a first, gas inlet end and a second, gas outlet end, the first, gas inlet end being closer to the longitudinal axis of the burner than the second, gas outlet end.

For an injection velocity greater than Mach 0.5 and preferably greater than Mach 1, the outlet end of the oxygen or oxygen-enriched-gas lance is preferably fitted with what is called a De Laval nozzle, having in succession a convergent cross section, followed by a divergent cross section. The gas feed pressure is adjusted according to the diameter of the injector and the desired velocity.

Preferably, the inert-gas lance is inclined at an angle $\alpha$ of between 0° and 45°, which angle is formed by the longitudinal axes of the lance and the burner, and the oxygen or oxygen-enriched-gas lance is inclined at an angle $\beta$ of between 0° and 20°, which angle is formed by the longitudinal axes of the lance and the burner. In a preferred embodiment, the device according to the invention comprises at least two inert-gas injection lances arranged concentrically around the burner and/or at least two oxygen or oxygen-enriched-gas injection lances arranged concentrically around the burner. In this way, the supply of gas or gases and the flame temperature is better homogenized. The angle $\alpha$ between the longitudinal axes of the burner and the inert-gas lance is chosen so as to allow the inert gas to be injected into the flame. Advantageously, it is between 0° and 45°, preferably between 0° and 20°, this value varying however with the geometry of the method in question and with the characteristic flame length, which is defined according to a first approximation as the length of the visible flame.

The angle $\beta$ between the longitudinal axes of the burner and the oxygen or oxygen-enriched-gas lance is chosen so that the oxygen or oxygen-enriched-gas flow delivered by this lance is tangential with the flame. It is advantageously between 0° and 20°, preferably between 0° and 10°, this value varying however with the geometry of the method in question and with the characteristic flame length. This inclination of the oxygen or oxygen-enriched-gas lance or lances toward the outside of the flame results in a broadening of the flame, thus increasing the combustion volume and further reducing the temperature peaks within the flame.

In one embodiment, the device according to the invention includes, at the outlet of the burner, a socket-shaped appendage having flared inner and outer edges. The inner edges are flared at an angle $\gamma$ to the longitudinal axis of the burner and the outer edges are flared at an angle $\delta$ to the same axis. Advantageously, the angle $\gamma$ is between 0° and 45°, preferably between 0° and 25°, and the angle $\delta$ is between 0° and 45°, preferably between 0° and 30°. The flaring of the inner edges of this appendage increases the gas recirculation in the flame at the outlet of the burner. What is thus obtained is more rapid and complete combustion. Because of its flared outer edges, the appendage serves as a deflector, able to guide the secondary air along a path such that it mixes with the flame only in the second combustion zone. This helps to optimize the spreading of the oxygen. The appendage is made of a material resistant to high temperatures i.e. above 1500° C. It is preferably a ceramic or a refractory material.

The combustion device according to the invention may be used in any type of high-temperature industrial kiln. However, it is particularly suitable for rotary kilns as used in the cement industry.

BRIEF DESCRIPTION OF THE FIGURES

Other features and advantages of the invention will become apparent on reading the description below, given with reference to the figures in which.

DETAILED DESCRIPTION OF THE INVENTION

Figure 1:
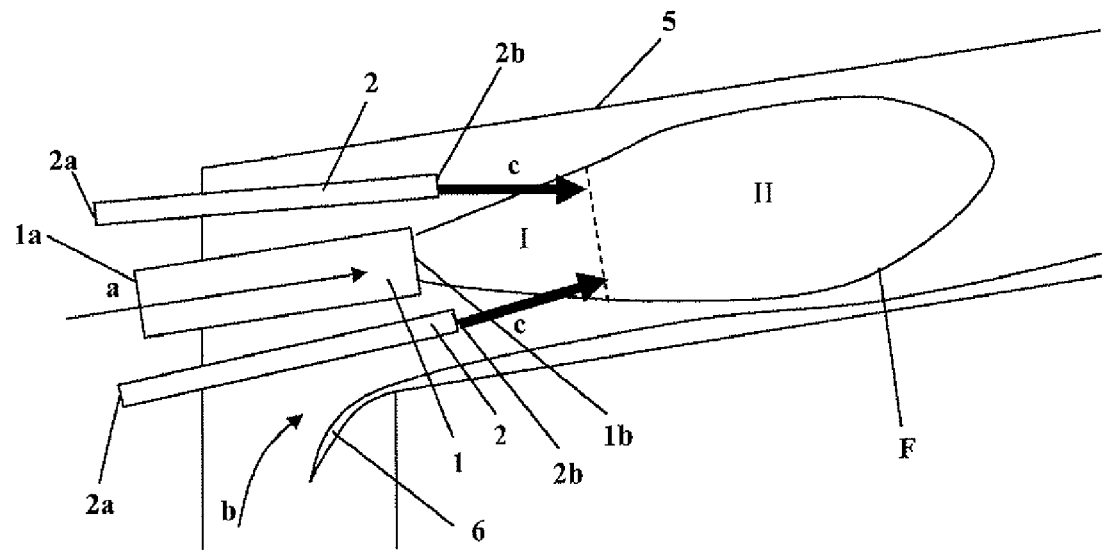
FIG. 1 shows schematically a cross section of one embodiment of a combustion device according to the invention.
Figure 2:
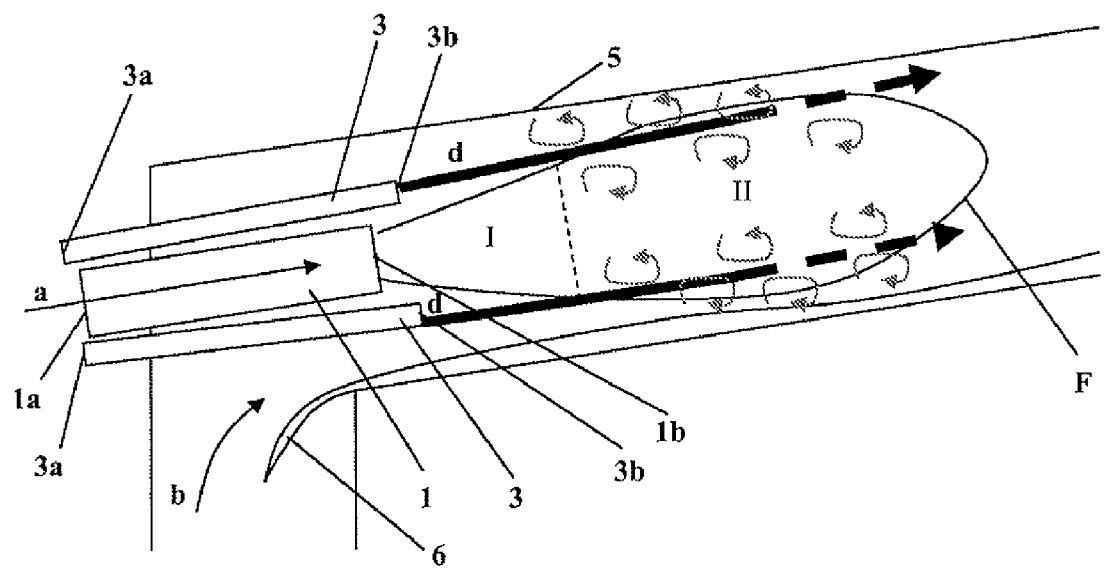
FIG. 2 shows schematically a cross section of another embodiment of a combustion device according to the invention.

FIGS. 1 and 2 show schematically the arrangement of two inert-gas lances 2 and oxygen or oxygen-enriched-gas lances 3, respectively, around the burner 1 at the outlet of a rotary calcining kiln. The kiln 5 is slightly inclined so as to allow the clinker 6 to be discharged. The burner 1 is supplied with a flow a of fuel and primary air. After this flow a has ignited at the outlet of the burner 1, the flame F is obtained.

Figure 3:
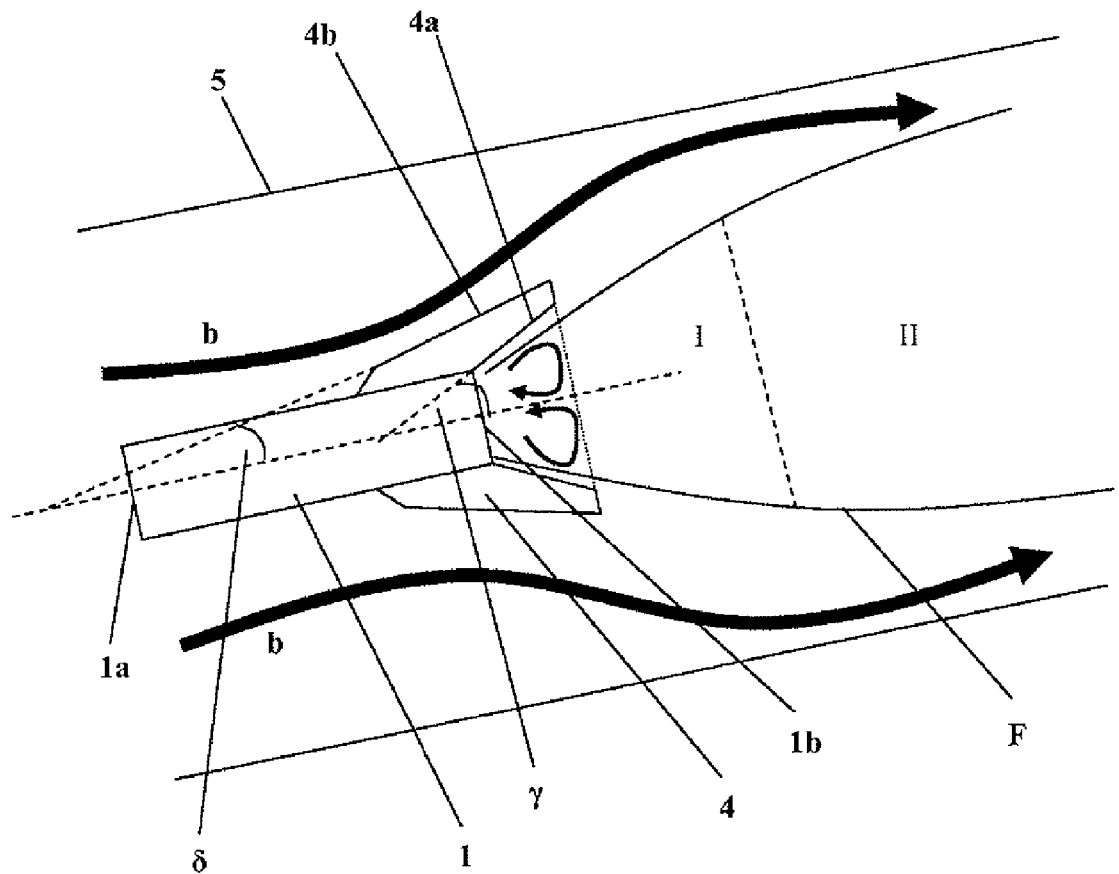
FIG. 3 shows schematically a cross section of an optional detail of a combustion device according to the invention.

In FIGS. 1, 2 and 3, the flame F is divided into two combustion zones I and II. The boundary between these two zones I and II is formed by the line where the flame F exceeds a temperature of 1500° C.: in zone I, the temperature is below 1500° C. and in zone II it is above 1500° C.

The rotary kiln 5 is also equipped with an air injection means (not shown in the figures) for delivering a flow b of secondary air around the burner. This flow b provides most of the combustion air and thus makes it possible to complete the combustion of the fuel started by the primary air.

Figure 1A:
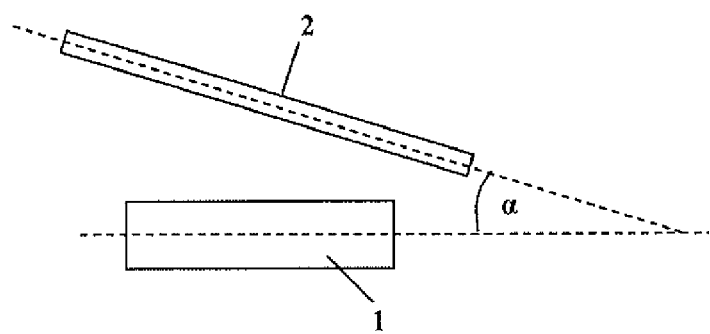
FIG. 1A shows schematically a detail of FIG. 1.

FIG. 1 shows a combustion device according to the invention comprising two inert-gas lances arranged concentrically around the burner 1. The inert-gas lances 2 are diametrically opposed. The lances 2 have a first, gas inlet end 2a and a second, gas outlet end 2b, the second, gas outlet end 2b being however closer to the longitudinal axis of the burner 1 than the first, gas inlet end 2a. Advantageously, the inert-gas lance 2 is inclined at an angle $\alpha$ of between 0° and 45°, preferably between 0° and 20°, which angle is formed by the longitudinal axes of the lance and the burner (FIG. 1A). However, the value of the angle $\alpha$ varies with the geometry of the method in question and with the characteristic length of the flame.

Figure 2A:
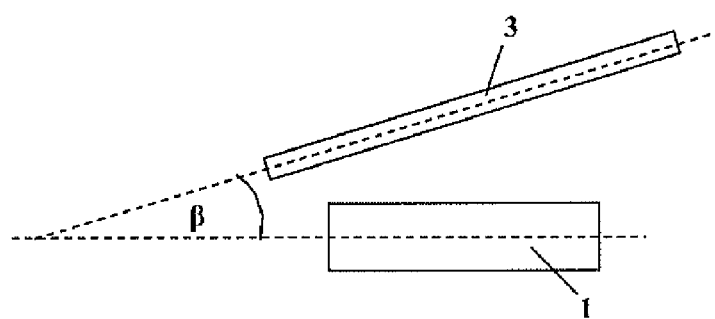
FIG. 2A shows schematically a detail of FIG. 2.

FIG. 2 shows a combustion device according to the invention comprising two oxygen or oxygen-enriched-gas lances 3 arranged concentrically around the burner 1. The inert gas lances oxygen or oxygen enriched-gas lances 3 are diametrically opposed. The lances 3 have a first, gas inlet end 3a and a second, gas outlet end 3b, the first, gas inlet end 3a being closer to the longitudinal axis of the burner 1 than the second, gas outlet end 3b. Advantageously, the oxygen or oxygen-enriched-gas lance 3 is inclined at an angle $\beta$ of between 0° and 20°, preferably between 0° and 10°, which angle is formed by the longitudinal axes of the lance and the burner (FIG. 2A). However, the value of the angle β varies with the geometry of the method in question and with the characteristic length of the flame.

In one advantageous embodiment (not shown), both embodiments shown in FIGS. 1 and 2 are combined to form a single device for improving the combustion according to the invention.

FIG. 3 shows an appendage 4 that is placed on the burner 1 at its outlet. This appendage 4 has the shape of a socket with flared inner edges 4a and flared outer edges 4b. The inner edges 4a are flared at an angle γ to the longitudinal axis of the burner and the outer edges 4b are flared at an angle δ to the same axis, the angle γ being greater than the angle δ. Advantageously, the angle γ is between 0° and 45°, preferably between 0° and 25°, and the angle δ is between 0° and 45°, preferably between 0° and 30°.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method of calcining a material, in which said material is heated in contact with a heat source essentially created by a flame generated by at least one flow of fuel and primary air and a flow of secondary air, the flame comprising a first combustion zone with a temperature below 1500° C. and a second combustion zone with a temperature above 1500° C., characterized in that:
   at least one flow of at least one inert gas is injected into the flame at the point where the second combustion zone starts; and/or
   at least one flow of oxygen or an oxygen-enriched gas is injected into the second combustion zone.

2. The method of claim 1, characterized in that the flow (or flows) is (or are) injected so that it (they) is (are) tangential with the flame in its second combustion zone.

3. The method of claim 1, characterized in that the inert gas is chosen from the group consisting of nitrogen, recirculation flue gases, carbon dioxide and steam.

4. The method of claim 1, characterized in that the inert gas is nitrogen.

5. The method of claim 1, characterized in that the flow (or flows) is (or are) injected with a greater velocity than that of the secondary air.

6. The method of claim 1, characterized in that the flow (or flows) is (or are) injected with a lower velocity than the speed of sound as measured in the kiln.

7. The method of claim 1, characterized in that the flow (or flows) is (or are) injected as one or more swirling injections possessing a tangential component.

8. The method of claim 1, characterized in that the flow (or flows) is (or are) injected with a velocity greater than Mach 0.5, preferably greater than Mach 1.

9. The method of claim 1, characterized in that it comprises the injection of the flow or flows of one or more inert gases or of a mixture of inert gases and the injection of the flow or flows of oxygen or of oxygen-enriched gas.

10. The method of claim 1, characterized in that the fuel comprises a solid fuel sprayed by an optionally oxygen-enriched carrier gas.

11. The method of claim 1, characterized in that the high-temperature industrial kiln is a rotary kiln.

12. The method of claim 1, characterized in that it is implemented using a device comprising:
   a burner that can be fed with oxidizer and fuel;
   an air injection means for delivering a flow of air around the burner;
   at least one inert gas injection lance having a first, gas inlet end and a second, gas outlet end, the second, gas outlet end being closer to the longitudinal axis of the burner than the first, gas inlet end; and/or
   at least one oxygen or oxygen-enriched-gas injection lance having a first, gas inlet end and a second, gas outlet end, the first, gas inlet end being closer to the longitudinal axis of the burner than the second, gas outlet end.

13. The method of claim 12, characterized in that the inert-gas injection lance is inclined at an angle α of between 0° and 45°, which angle formed by the longitudinal axes of the lance and the burner, and in that the oxygen or oxygen-enriched-gas injection lance is inclined at an angle β of between 0° and 20°, which angle is formed by the longitudinal axes of the lance and the burner.

14. The method of claim 12, characterized in that it comprises:
   at least two inert-gas injection lances arranged concentrically around the burner; and/or
   at least two oxygen or oxygen-enriched-gas injection lances arranged concentrically around the main burner.

15. The method of claim 12, characterized in that the burner includes, at its outlet, a socket-shaped appendage having flared inner and outer edges, the inner edges being flared at an angle γ to the longitudinal axis of the burner and the outer edges being flared at an angle δ to the longitudinal axis of the burner, the appendage serving both as quarl for the combustion, initiated at the outlet of the burner, and as deflector for the secondary air.

16. The use of the method of claim 1 for calcining an ore-based material.

* * * * *